United States Patent [19]

Ogura et al.

[11] Patent Number: 6,005,628
[45] Date of Patent: Dec. 21, 1999

[54] PICTURE ENCODING METHOD AND PICTURE ENCODING APPARATUS

[75] Inventors: Eiji Ogura, Saitama; Masatoshi Takashima, Tokyo, both of Japan

[73] Assignee: Sony Corporation, Tokyo, Japan

[21] Appl. No.: 09/193,433

[22] Filed: Nov. 17, 1998

Related U.S. Application Data

[63] Continuation of application No. PCT/JP98/00899, Mar. 4, 1998.

[30] Foreign Application Priority Data

Mar. 19, 1997 [JP] Japan ................................ 9-065868

[51] Int. Cl.$^6$ ............................................. H04N 7/32
[52] U.S. Cl. ................................. 348/416; 348/699
[58] Field of Search .................................. 348/416, 413, 348/699, 700, 402, 407, 364, 390; 386/111; 382/236, 238, 244; 375/240; H04N 7/32

[56] References Cited

U.S. PATENT DOCUMENTS

| | | | |
|---|---|---|---|
| 4,691,230 | 9/1987 | Kaneko et al. | 348/699 |
| 5,682,209 | 10/1997 | Borgwardt | 348/699 |
| 5,731,838 | 3/1998 | Gunji et al. | 348/415 |
| 5,786,860 | 7/1998 | Kim et al. | 348/416 |
| 5,828,785 | 10/1998 | Kitsuki | 348/416 |
| 5,886,744 | 3/1999 | Hannah | 348/416 |

FOREIGN PATENT DOCUMENTS

| | | | |
|---|---|---|---|
| 5-137131 | 6/1993 | Japan | H04N 7/137 |
| 6-233285 | 8/1994 | Japan | H04N 7/137 |
| 8-9385 | 1/1996 | Japan | H04N 7/32 |
| 8-265765 | 10/1996 | Japan | H04N 7/32 |

*Primary Examiner*—Vu Le
*Attorney, Agent, or Firm*—Frommer Lawrence & Haug, LLP.; William S. Frommer

[57] ABSTRACT

Initially, forward prediction reference block data which has been read out from a reference frame memory and retrieval block data which has been read out from a retrieval frame memory are used to detect forward prediction motion vector and its residual by a forward prediction motion detecting circuit to preserve (store) them into a forward prediction motion vector/residual preservation memory. Then, backward prediction reference block data which has been read out from the reference frame memory and retrieval block data which has been read out from the retrieval frame memory are used to detect, by a backward prediction motion detecting circuit, backward prediction motion vector and its residual, and to read out motion vector and its residual which have been preserved (stored) in the forward prediction motion vector/residual preservation memory to carry out encoding by using these motion vectors in both directions.

8 Claims, 8 Drawing Sheets

PICTURE ENCODING METHOD AND PICTURE ENCODING APPARATUS

This is a continuation of copending International Application PCT/JP98/00899 having an international filing date of 4 Mar. 1998.

TECHNICAL FIELD

This invention relates to a picture encoding method and a picture encoding apparatus in conformity with, e.g., MPEG (Moving Picture Image Coding Experts Group).

BACKGROUND ART

The MPEG system is encoding system in which DCT (Discrete Cosine Transform), motion compensation prediction and variable length encoding are combined to carry out compression of picture data.

Figure 1:
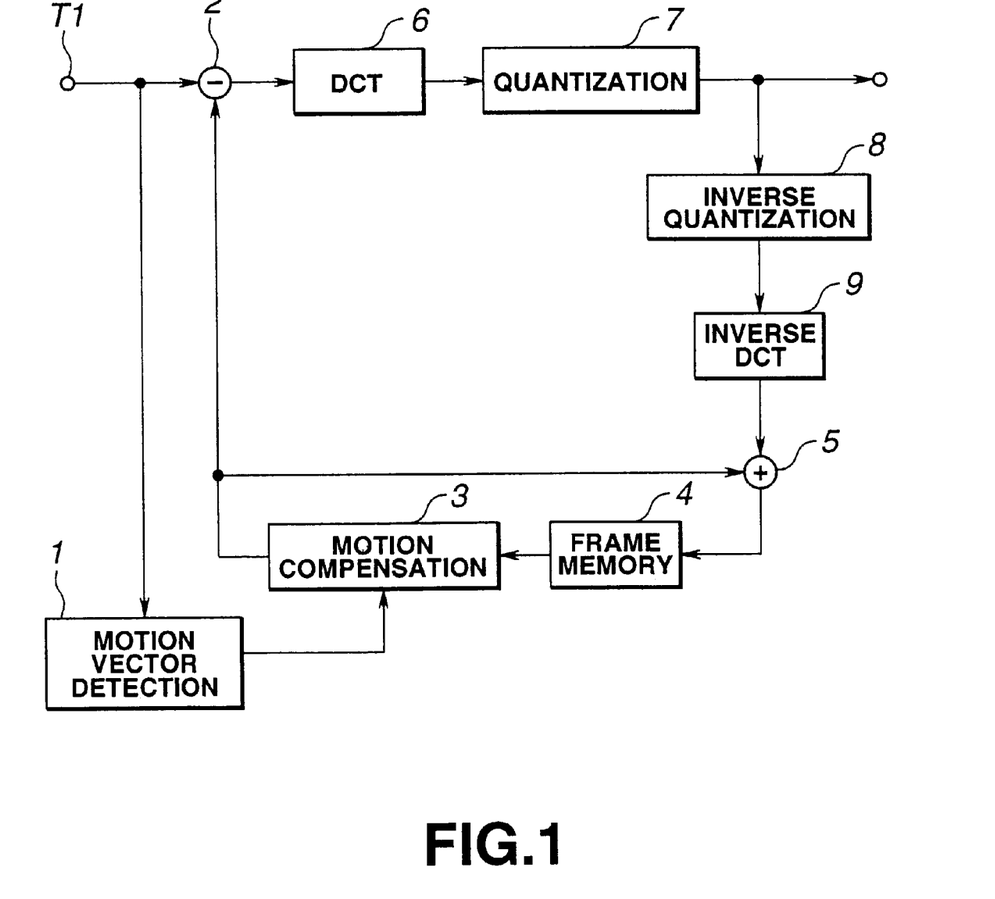
FIG. 1 is a block diagram showing the configuration of a picture encoding apparatus in conformity with MPEG.

The configuration of a picture encoding apparatus based on the MPEG system is shown in FIG. 1. In this figure, an input terminal T1 is supplied with picture data. This picture data is inputted to a motion vector detecting circuit 1 and a subtracting circuit 2. The motion vector detecting circuit 1 determines, by using inputted picture data, motion vector between current frame and reference frame (e.g., forward frame) to deliver it to a motion compensating circuit 3.

Picture data of reference frame is stored also in a frame memory 4. This picture data is delivered to the motion compensating circuit 3. At the motion compensating circuit 3, motion vector sent from the motion vector detecting circuit 1 is used to carry out motion compensation of picture data sent from the frame memory 4. Output of the motion compensating circuit 3 is sent to the subtracting circuit 2 and an adding circuit 5.

In the subtracting circuit 2, subtractive processing between picture data of current frame delivered from the input terminal T1 and picture data of motion-compensated reference frame which is delivered from the motion compensating circuit 3 is carried out to determine predictive error data to deliver it to a DCT circuit 6. The DCT circuit 6 allows this predictive error data to undergo DCT processing to send it to a quantizer 7. The quantizer 7 quantizes output of the DCT circuit 6 to send it to variable length encoding circuit (not shown).

Output of the quantizer 7 is delivered also to an inverse-quantizer 8, at which it undergoes inverse-quantization processing. Its output undergoes inverse DCT processing at an inverse DCT circuit 9 so that it is restored (reconstructed) into original predictive error data. The predictive error data thus obtained is delivered to the adding circuit 5.

At the adding circuit 5, this predictive error data is added to output data of the motion compensating circuit 3 to determine picture data of current frame. The picture data thus determined is stored into the frame memory 4 as picture data of the next reference frame.

As a method of motion vector detection in such a picture encoding apparatus, block matching method is known. In accordance with the block matching method, picture is divided into small rectangular areas (blocks) to detect motion (motion) every block. As size of the block, there are 8 pixels (lateral direction)×8 pixels (longitudinal direction) (hereinafter abbreviated as 8×8), 16×16, etc. The block matching method will now be described with reference to FIG. 2.

Figure 2:
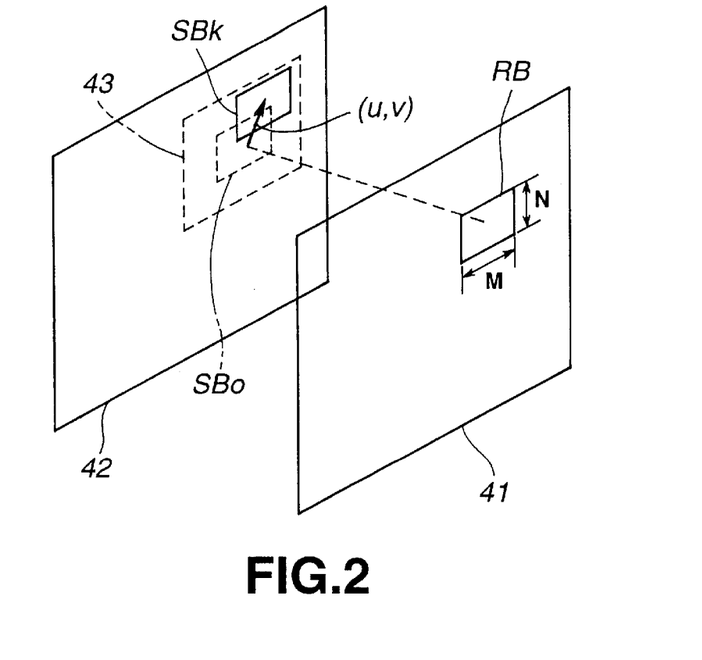
FIG. 2 is a view for explaining the block matching method.

In FIG. 2, reference block RB of M×N is set within reference frame 41. Moreover, search (test) block SB of the same size as the reference block RB is set within retrieval frame 42. The search block SB is moved circulating within a predetermined search range 43 of ±m×±n with the same position as the reference block RB being as center. Further, the degree of correspondence between reference block RB and search (test) block SB is calculated to allow the search (test) block in which the degree of correspondence is maximum to be matching block to determine motion vector from this matching block.

Namely, in the case where the degree of correspondence between reference block RB and search (test) block SBk located at position shifted by (u, v) from search (test) block SB0 located at the same position as the reference block RB is maximum, motion vector of that search (test) block SB is assumed to be (u, v). At this time, search (test) block in which sum total of absolute value differences every pixels or sum total of square of differences every pixels at respective corresponding positions of the reference block RB and search (test) block SB is minimum is assumed to be search (test) block in which the degree of correspondence is maximum.

In the MPEG system, one sequence of moving picture is divided into GOP (Group of Picture) consisting of plural frames (pictures) to carry out encoding. The GOP consists of intraframe encoded pictures (I pictures), interframe encoded pictures (P pictures) predicted from already encoded frame forward in point of time, and interframe encoded pictures (B pictures) predicted from already encoded two frames before and after in point of time.

Figure 3:
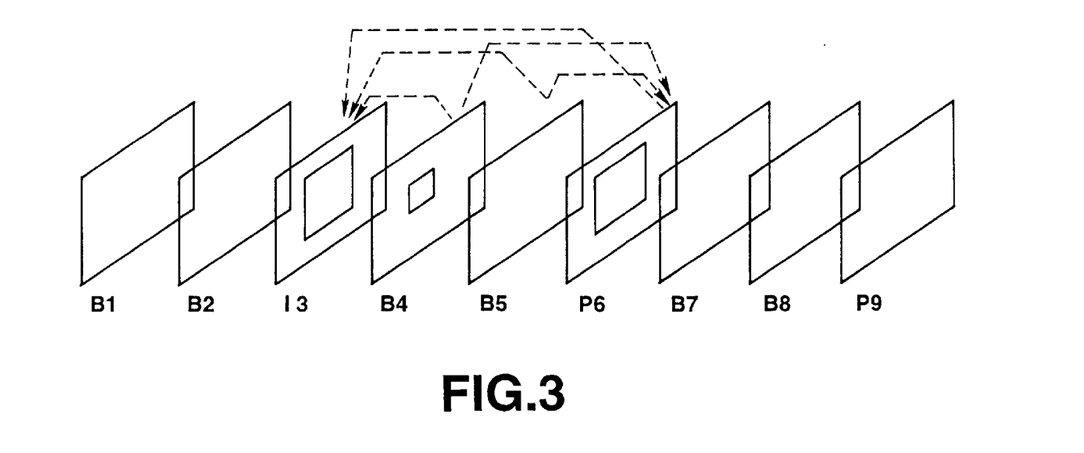
FIG. 3 is a view showing an example of motion detection in MPEG.

For example, in FIG. 3, initially, P6 which is P picture is caused to be reference frame and I3 which is I picture is caused to be retrieval frame to carry out motion detection. Then, B4 which is B picture is caused to be reference frame and I3 and P6 are caused to be retrieval frame to carry out motion detection in both directions (bidirectional motion detection). Then, B5 which is B picture is caused to be reference frame and I3 and P6 are caused to be retrieval frame to carry out bidirectional motion detection.

Explanation will now be given in detail with reference to the timing diagram shown in FIG. 4. As an example, the case where current frame B4 is caused to be macro block of reference at time t1 to carry out, at the same time, bidirectional prediction to retrieval frame (retrieval frame 0) I3 of the forward prediction and retrieval frame (retrieval frame 1) P6 of the backward prediction to determine two motion vectors will be described. In this case, transfer of data of reference block is required from current frame B4, and transfer of data of retrieval block is required from two retrieval frames (I3 and P6).

Accordingly, when it is assumed that one pixel is 8 bits, size of reference block is 16×16 and the search ranges in horizontal and vertical directions are both ±16, data transfer quantity for processing one reference block becomes equal to 38 K bits in total because reference block is 8×16×16×1=2 K bits and retrieval block is 8×48×48×2=36 K bits.

As stated above, in accordance with the conventional motion detection method, in carrying out bidirectional prediction, it was necessary to transfer large quantity of data of retrieval frame. Thus, this was great problem in realization of hardware.

Figure 4:
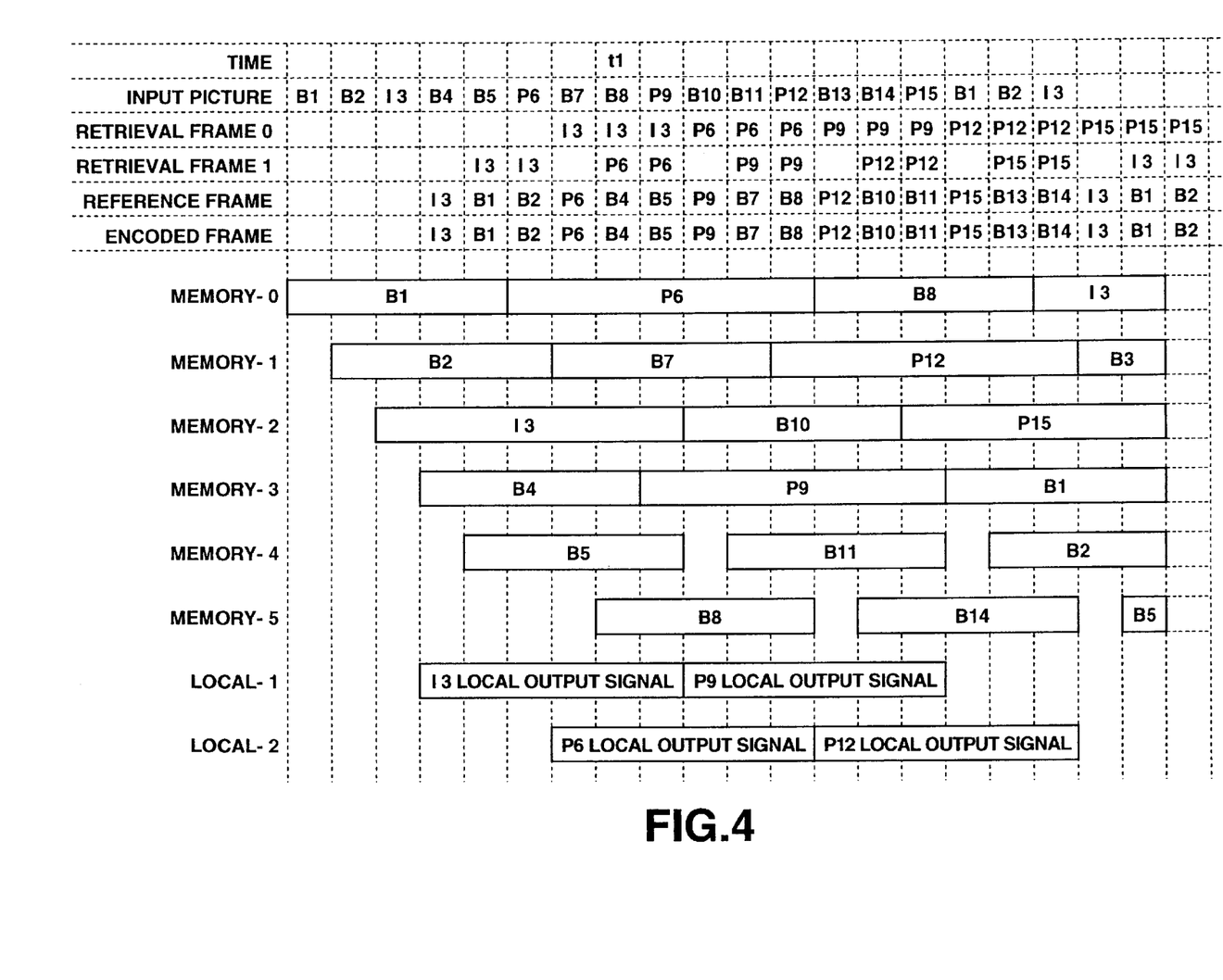
FIG. 4 is a timing chart for explaining operation timing of a conventional motion vector detecting circuit and use of frame memories.

Further, in this picture encoding apparatus, it was necessary to prepare six frame memories in total of MEMORY-0 to MEMORY-5 to hold respective frames only for time periods shown in FIG. 4. Moreover, local decode memories of LOCAL-1 and LOCAL-2 were also required for local decode output. Namely, eight memories in total were required as the conventional picture encoding apparatus.

For example, when input picture B1 is delivered, MEMORY-0 holds B1 until encoding has been completed. With respect to respective B frames, they are similarly held in respective MEMORIES until they are encoded. In this case, I and P frames used as retrieval frame are stored into the respective frame memories until forward and backward motion vectors of respective frames are detected, i.e., for time periods during which those frames are required as retrieval frame for detecting the motion vector.

DISCLOSURE OF THE INVENTION

This invention has been made in view of the above-mentioned problems and its object is to provide a picture encoding method and a picture encoding apparatus which can reduce data transfer quantity of retrieval frame in carrying out bidirectional prediction.

Moreover, another object of this invention is to provide a picture encoding method and a picture encoding apparatus which can reduce capacity of memories for reference frame and retrieval frame.

To realize this, the above-mentioned picture encoding method is directed to a picture encoding method of carrying out motion detection from pictures in forward direction and in backward direction in point of time to carry out picture encoding, the method comprising: an input picture memory step of storing input picture to be encoded into a memory section; a forward motion detection step of detecting, from retrieval picture located in forward direction in point of time relative to first picture stored in the memory section at the input picture memory step, forward motion vector of the first picture; a backward motion detection step of detecting, from the retrieval picture, backward motion vector of second picture stored in the memory section at the input picture memory step and located forward in point of time relative to the retrieval picture; a motion vector preservation step of preserving, into a preservation section, the forward motion vector of the first picture detected by the forward motion detection step; and an encoding step of reading out, when encoding the first picture, the forward motion vector of the first picture from the motion vector preservation step to detect backward motion vector with respect to the first picture from the backward motion vector detection step to carry out encoding by using motion vectors in forward and backward directions.

In this case, the first and second pictures are processed in plural block units obtained by dividing the input picture.

Moreover, at the motion detection step of the forward and backward directions, the block matching method is used to detect motion vectors.

Further, in accordance with a picture encoding method according to this invention, a procedure is taken to determine, by calculation, picture data of reference block and picture data of retrieval block within retrieval range to detect motion vector in the forward direction and motion vector in the backward direction, whereby when motion vectors in the both directions are used to carry out encoding, detection timing of motion vector in one direction is shifted forward in point of time relative to encoding timing to thereby allow at least a portion of picture data of the retrieval block to be common to detection of motion vectors in the both directions.

In this case, motion vector detected forward in point of time relative to the encoding timing is preserved (stored) into the preservation section to read out it in correspondence with the encoding timing.

Moreover, a picture encoding apparatus according to this invention is directed to a picture encoding apparatus adapted for carrying out motion detection from pictures in forward and backward directions in point of time to carry out picture encoding, the apparatus comprising: input picture memory means for storing input picture to be encoded; forward motion detecting means for detecting, from retrieval picture located in forward direction in point of time relative to first picture stored by the input picture memory means, forward motion vector of the first picture; backward motion detecting means for detecting, from the retrieval picture, backward motion vector of second picture stored in the input picture memory means and located forward in point of time relative to the retrieval picture; motion vector preserving means for preserving the forward motion vector of the first picture detected by the forward motion detecting means; and encoding means for reading out, when encoding the first picture, the forward motion vector of the first picture from the motion vector preserving means to detect backward motion vector with respect to the first picture from the backward motion vector detecting means to carry out encoding by using these motion vectors in the forward and backward directions.

In this case, the first and second pictures are processed in plural block units obtained by dividing the input picture.

In addition, the motion detecting means in forward and backward directions detect motion vectors by using the block matching method.

BEST MODE FOR CARRYING OUT THE INVENTION

Preferred embodiments of a picture encoding method and a picture encoding apparatus according to this invention will be described below with reference to the attached drawings. This embodiment is directed to the picture encoding apparatus in conformity with MPEG system shown in FIG. 1 in which the configuration of the motion vector detecting circuit 1 is caused to be a motion vector detecting circuit shown in FIG. 5. In the following description, explanation of other respective components of the picture encoding apparatus will be omitted.

Figure 5:
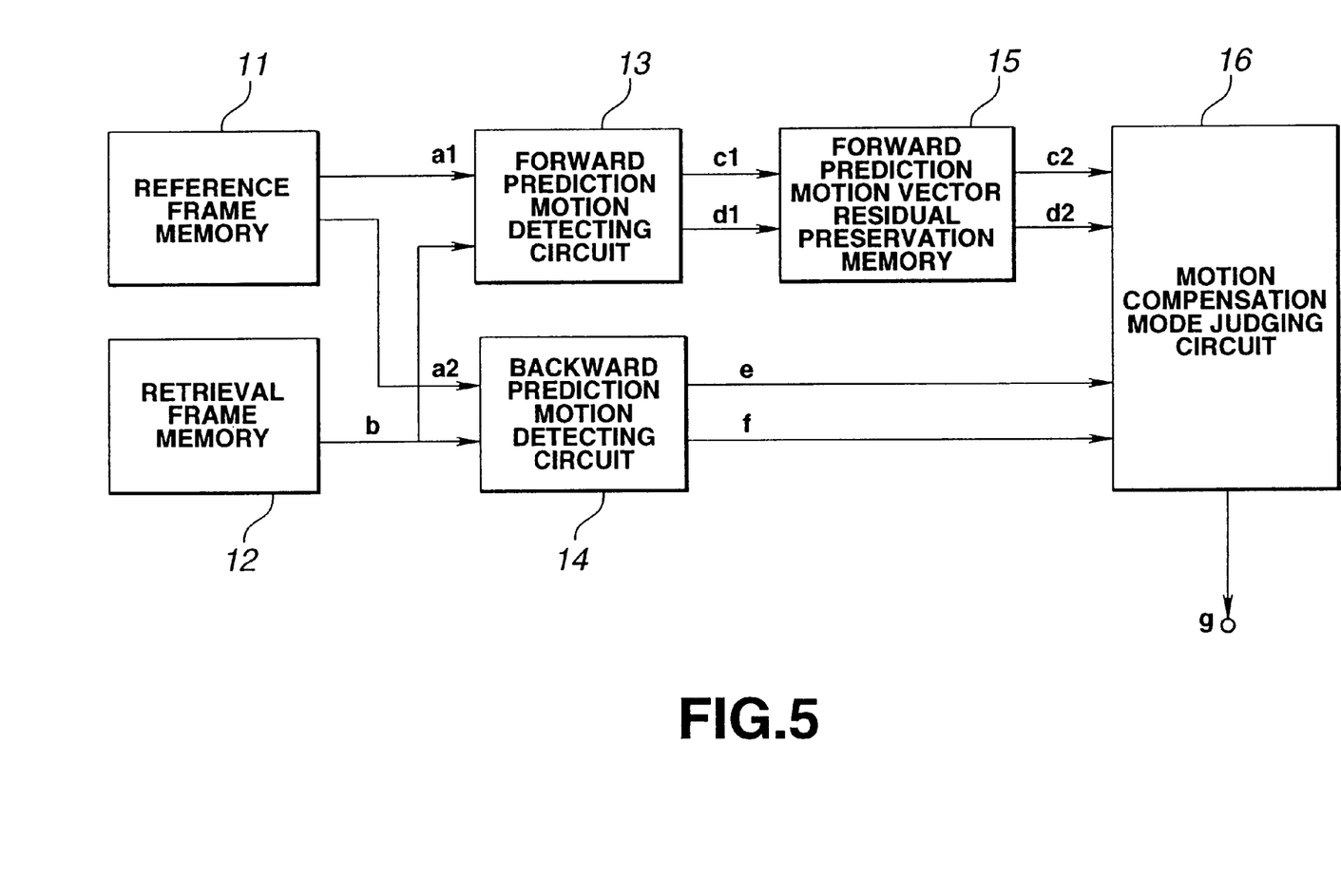
FIG. 5 is a block diagram showing a first form of a motion vector detecting circuit applicable to an embodiment of a picture encoding method and a picture encoding apparatus according to this invention.

In FIG. 5, the motion vector detecting circuit is composed of a reference frame memory 11, a retrieval frame memory 12, a forward prediction motion detecting circuit 13, a backward prediction motion detecting circuit 14, a forward prediction motion vector/residual preservation memory 15, and a motion compensation mode judging circuit 16.

The retrieval frame memory 12 serves to store picture of retrieval frame. Further, retrieval block data b is read out therefrom, and is inputted commonly to the forward prediction motion detecting circuit 13 and the backward prediction motion detecting circuit 14.

The forward prediction motion detecting circuit 13 determines forward prediction motion vector c1 and its residual d1 to output them to the forward prediction motion vector/residual preservation memory 15.

In the forward prediction motion vector/residual preservation memory 15, the forward prediction motion vector c1 and the residual d1 which are inputted thereto are preserved (stored). Simultaneously therewith, forward prediction motion vector c2 and residual d2 which have been already preserved (stored) are read out, and are inputted to the motion compensation mode judging circuit 16.

The backward prediction motion detecting circuit 14 determines backward prediction motion vector e and its residual f to deliver them to the motion compensation mode judging circuit 16. This motion vector e is determined by the block matching method similarly to the prior art.

The motion compensation mode judging circuit 16 carries out, by using data inputted thereto, judgment of motion compensation mode, and detection of motion vector and residual, etc. to output its result g.

Figure 6:
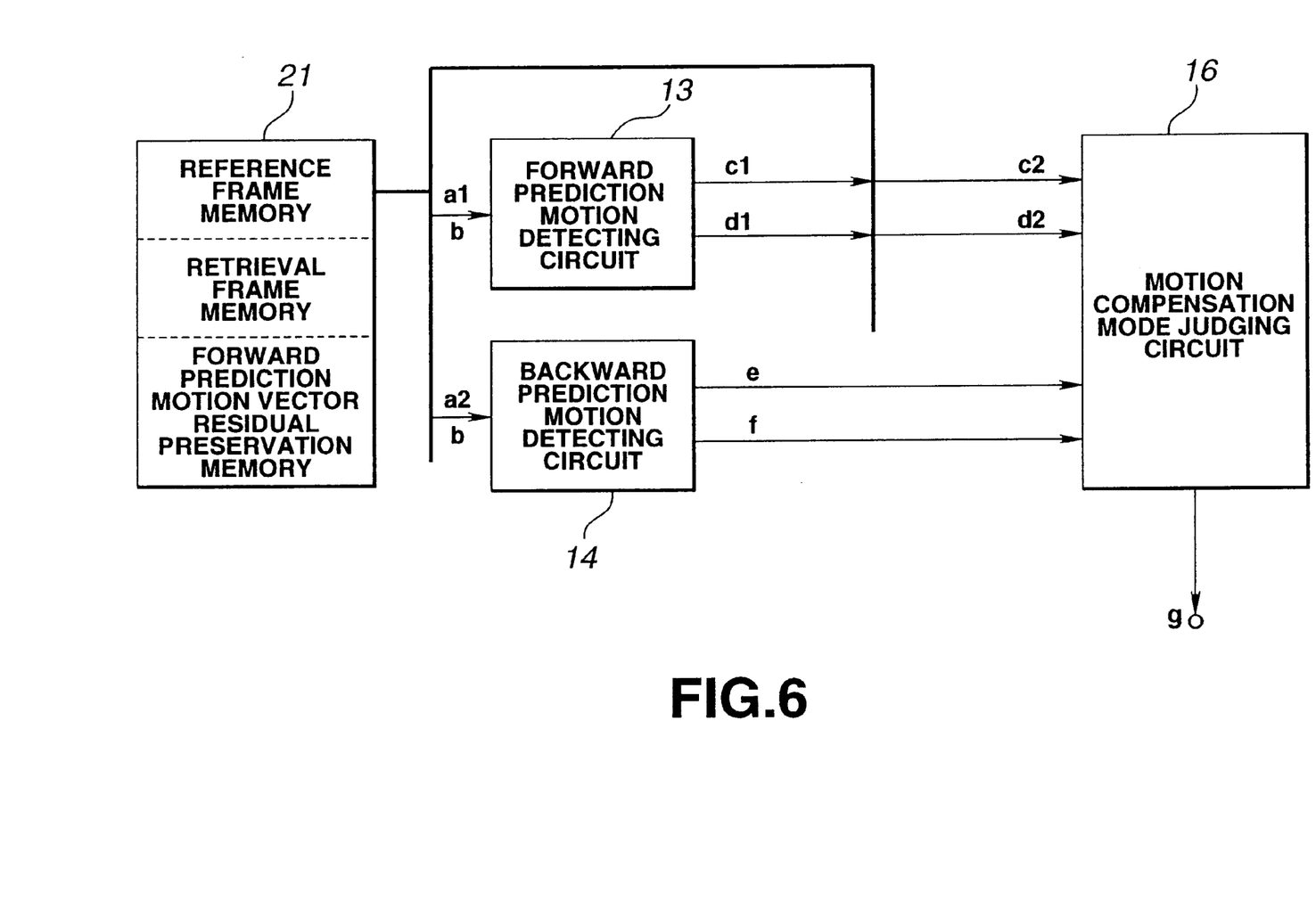
FIG. 6 is a block diagram showing a second form of the motion vector detecting circuit.

FIG. 6 is a block diagram showing a second form of the motion vector detecting circuit. In this case, the same reference numerals and symbols as those of FIG. 5 are respectively attached to the portions which are the same as those of FIG. 5. The motion vector detecting circuit shown in FIG. 6 collectively represents, as a single memory 21, the reference frame memory 11, the retrieval frame memory 12 and the forward prediction motion vector/residual preservation memory 15 in FIG. 5, and the signal line is caused to be bus form.

The operation of the motion vector detecting circuit shown in these FIGS. 5 and 6 will be described with reference to the flowchart of FIG. 7. In addition, operation timing is shown in FIG. 8.

Figure 7:
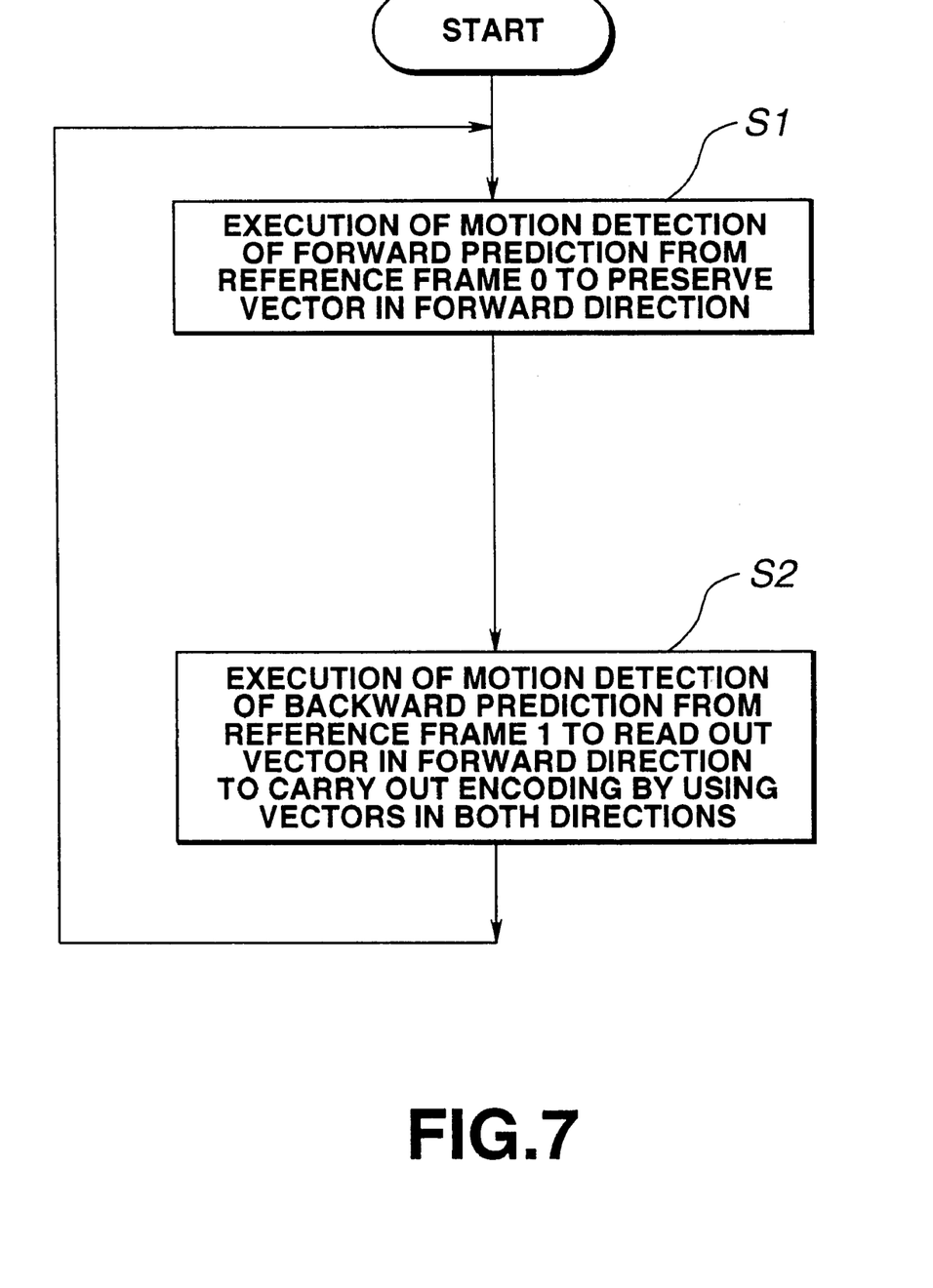
FIG. 7 is a flowchart for explaining operation of the motion vector detecting circuit.

As shown in FIG. 7, in the above-mentioned motion vector detecting circuit, reference frame 0 is not encoded frame, and motion vector in forward direction from the reference frame 0 and its residual are preserved (stored) into forward prediction motion vector/residual preservation memory 15 at step S1. Further, at time to be encoded, at step S2, backward predictive vector from the reference frame 1 is determined and the motion vector in forward direction and its residual which have been preserved at the step S1 are read out to carry out encoding of the reference frame 1. At times subsequent thereto, such operation will be repeated.

Figure 8:
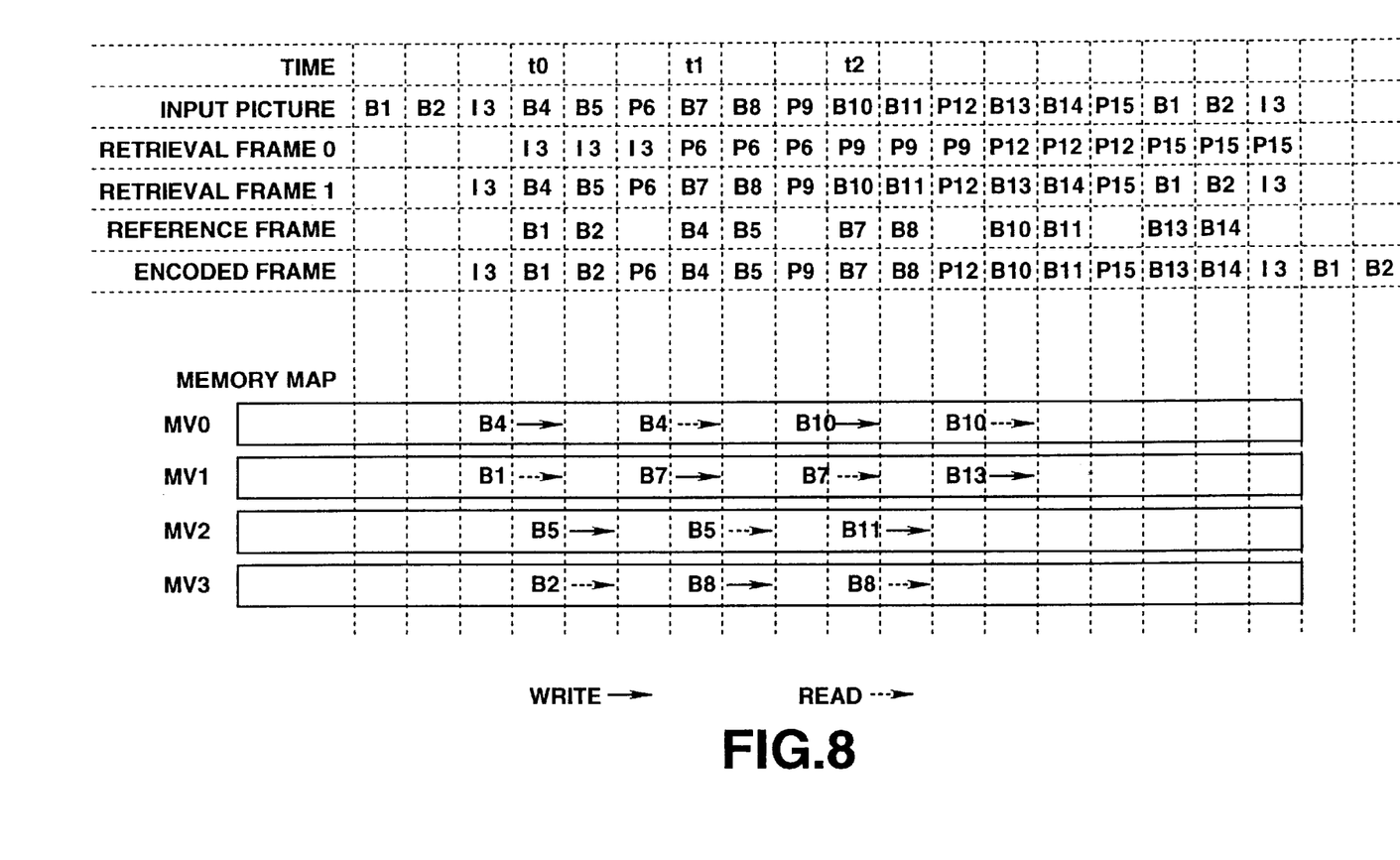
FIG. 8 is a timing chart for explaining operation of the motion vector detecting circuit.

As shown in FIG. 8, e.g., at time t0, there is carried out motion detection in which current frame B4 is caused to be macro block of reference and frame 13 is caused to be retrieval frame for forward prediction. Thus, its motion vector and residual are written into bank MV0 of the forward prediction motion vector/residual preservation memory 15.

At time t1, there is carried out motion detection in which current frame B4 is caused to be macro block of reference and frame P6 is caused to be retrieval frame for backward prediction. Simultaneously therewith, the forward motion vector and the residual preserved (stored) in the bank MV0 at the time t0 are read out. As a result, motion vectors in both directions required for encoding frame B4 are all present (gathered) at the time t1.

At the time t1, data of frame B7 is further transferred as reference block data, and forward motion vector from the frame B7 to frame P6 and its residual are detected. Thus, those data are written into bank MV1 of the forward prediction motion vector/residual preservation memory 15. The forward motion vector and the residual are read out at time t2, and are used for encoding frame B7.

Moreover, at the time t2, backward motion vector from frame B7 to frame P9 and its residual are similarly determined.

In a manner as stated above, retrieval data of one kind (data of frame P6 at time t1) and reference block data of two kinds (data of frame B7 and frame B4 at time t1) are transferred at all times to carry out read/write operation of forward motion vector and its residual with respect to the memory to thereby determine motion vectors in both directions required for bidirectional prediction. Thus, encoding using bidirectional prediction can be made. Namely, such an approach is employed to shift timing at which motion vector in forward direction and its residual are detected relative to timing of detection of motion vector in backward direction and its residual (thus also relative to encoding timing) to thereby allow retrieval data of one kind to be common to reference block data of two kinds. By this data common use system, transfer quantity of retrieval data is reduced. It is to be noted that in the case where residual is not required for processing, it is not necessarily required to preserve (store) such residual.

In this case, in this embodiment, data transfer quantity necessary for bidirectional prediction is calculated. Since transfer quantity in carrying out read/write operation of motion vector and its residual is negligible quantity of the order of several ten bits, when only transfer quantities of reference block data and retrieval block data are calculated, the entire transfer quantity becomes equal to 22K bits in total of transfer quantity of reference block of 8×16×16×2=4K bits and transfer quantity of retrieval block of 8×48×48×1= 18K bits. As compared to conventional 38K bits, this value is reduced by about 40%.

While the case where the search range is set to ±16 both in the horizontal direction and in the vertical direction has been described, since according as the search range becomes broader, transfer quantity of retrieval block data is increased to more degree, transfer quantity reduction effect by this invention is enhanced to more degree. Moreover, while the case where the number of B pictures is 2 has been described, this invention is not limited to such a case. Further, while the case where the search range of the forward prediction and the search range of the backward prediction are the same has been described, this invention can be also applied to the case where, e.g., search range of one direction (forward direction) is broad. In that case, a portion of search data is caused to be common.

Figure 9:
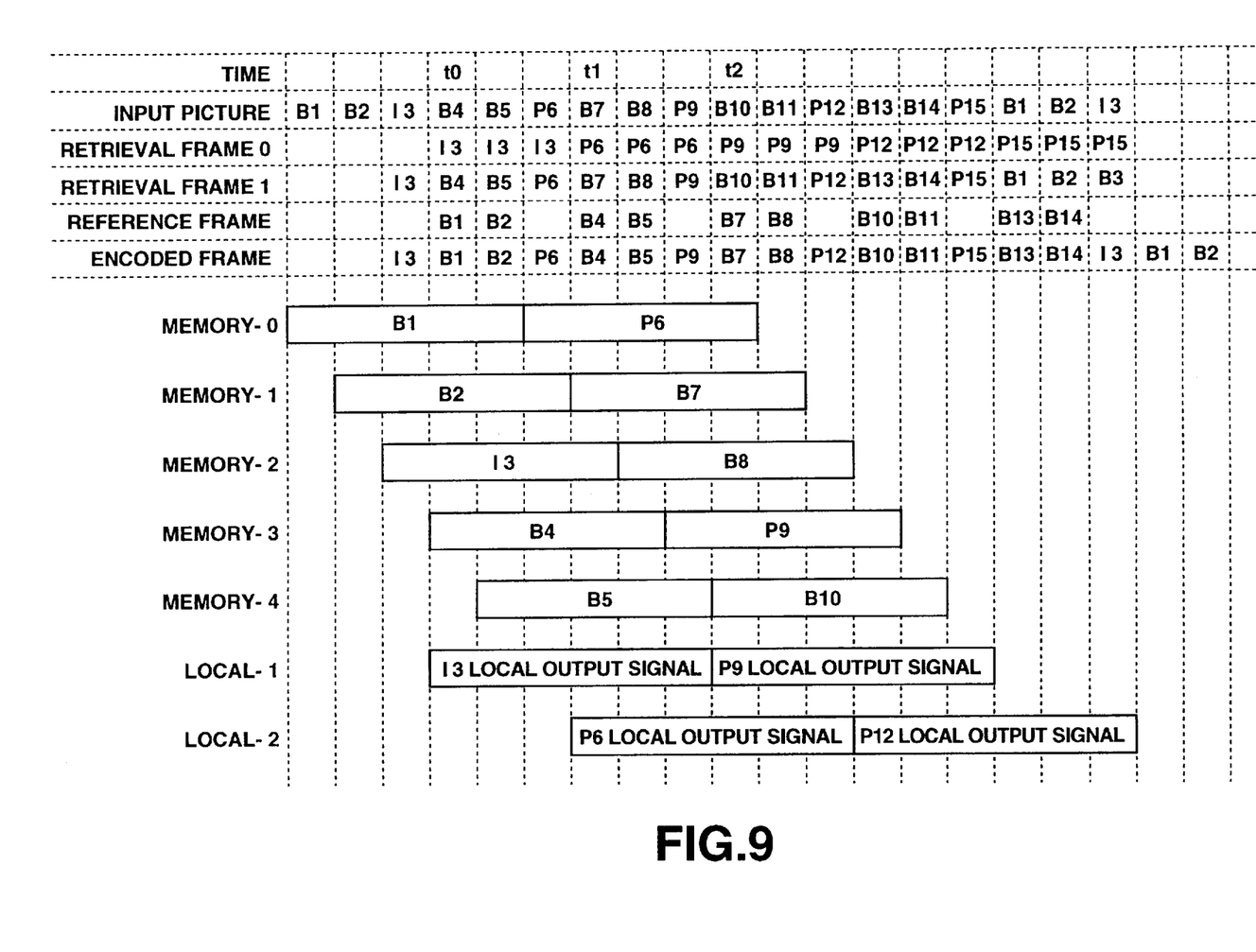
FIG. 9 is a timing chart for explaining frame memory reduction of the motion vector detecting circuit.

Further, in the above-mentioned motion vector detecting circuit, the number of frame memories used as the reference memory 11 and the retrieval frame memory 12 can be reduced to more degree as compared to the number of conventional frame memories, which has been described with reference to FIG. 4. This reduction of frame memories will be described below with reference to FIG. 9.

When B1 is delivered as input picture, MEMORY-0 holds B1 until encoding is completed. Respective B frames are similarly held in respective MEMORIES until they are encoded. In this case, I and P frames used as retrieval frame are released immediately after they are used for detection of motion vector in the backward direction because motion vector in the forward direction is already detected. As stated above, in accordance with the picture encoding apparatus using motion vector detecting circuit shown in FIGS. 5 and 6, the time required for storage of I and P frames into the memory can be shortened. For this reason, the number of MEMORIES used as reference frame memories and retrieval frame memories can be reduced to five (5) which is lesser by one than the number of memories used in the conventional motion vector detecting circuit, e.g., six (6) in FIG. 4.

As described above in detail, in accordance with this invention, in the case of carrying out bidirectional motion detection, transfer quantity of retrieval data can be reduced. Further, reduction of transfer quantity of data permits reduction of bus width from the memory and low speed of transfer clock. For this reason, realization by hardware becomes easy. As a result, reduced cost of hardware and low power consumption thereof can be realized. In addition, capacity of the memory for storing original picture can be reduced.

We claim:

1. A picture encoding method of carrying out motion detection from pictures in forward and backward directions in point of time to carry out picture encoding, the method comprising:

an input picture memory step of storing input picture to be encoded into a memory section;

a forward motion detection step of detecting, from retrieval picture located in forward direction in point of time relative to first picture stored in the memory section at the input picture memory step, forward motion vector of the first picture;

a backward motion detection step of detecting, from the retrieval picture, backward motion vector of second picture stored in the memory section at the input picture memory step and located forward in point of time relative to the retrieval picture;

a motion vector preservation step of preserving the forward motion vector of the first picture detected by the forward motion detection step into a preservation section; and an encoding step of reading out, when encoding the first picture, the forward motion vector of the first picture from the motion vector preservation step to detect backward motion vector with respect to the first picture from the backward motion vector detection step to carry out encoding by using these motion vectors in the forward and backward directions.

2. A picture encoding method as set forth in claim 1, wherein the first and second pictures are processed in plural block units obtained by dividing the input picture.

3. A picture encoding method as set forth in claim 2, wherein at the forward and backward motion detection steps, motion vector is detected by using the block matching method.

4. A picture encoding method of determining, by calculation, picture data of reference block and picture data of retrieval block within retrieval range to detect motion vector in forward direction and motion vector in backward direction, whereby when these motion vectors in both directions are used to carry out encoding, detection timing of motion vector in one direction is shifted forward in point of time relative to encoding timing to thereby allow at least a portion of picture data of the retrieval block to be common to motion vector detection in both directions.

5. A picture encoding method as set forth in claim 4, wherein motion vector detected forward in point of time relative to the encoding timing is preserved into a preservation section to read out it in correspondence with encoding timing.

6. A picture encoding apparatus adapted for carrying out motion detection from pictures in forward and backward directions in point of time to carry out picture encoding, the apparatus comprising:

input picture memory means for storing input picture to be encoded;

forward motion detecting means for detecting, from retrieval picture located in forward direction in point of time relative to first picture stored by the input picture memory means, forward motion vector of the first picture;

backward motion detecting means for detecting, from the retrieval picture, backward motion vector of second picture stored in the input picture memory means and located forward in point of time relative to the retrieval picture;

motion vector preserving means for preserving the forward motion vector of the first picture detected by the forward motion detecting means; and encoding means for reading out, when encoding the first picture, the forward motion vector of the first picture from the motion vector preserving means to detect backward motion vector with respect to the first picture from the backward motion vector detecting means to carry out encoding by using these motion vectors in the forward and backward directions.

7. A picture encoding apparatus as set forth in claim 6, wherein the first and second pictures are processed in plural block units obtained by dividing the input picture.

8. A picture encoding apparatus as set forth in claim 7, wherein the motion detecting means in the forward and backward directions detect motion vector by using the block matching method.

* * * * *